US011370905B2

United States Patent
Wang et al.

(10) Patent No.: US 11,370,905 B2
(45) Date of Patent: Jun. 28, 2022

(54) POLYOLEFIN COMPOSITION WITH IMPROVED BALANCE OF PROPERTIES

(71) Applicant: BOREALIS AG, Vienna (AT)

(72) Inventors: Jingbo Wang, Linz (AT); Markus Gahleitner, Linz (AT); Klaus Bernreitner, Linz (AT); Yi Liu, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/289,585

(22) PCT Filed: Oct. 24, 2019

(86) PCT No.: PCT/EP2019/079072
§ 371 (c)(1),
(2) Date: Apr. 28, 2021

(87) PCT Pub. No.: WO2020/089037
PCT Pub. Date: May 7, 2020

(65) Prior Publication Data
US 2021/0355308 A1 Nov. 18, 2021

(30) Foreign Application Priority Data
Oct. 31, 2018 (EP) .................................. 18203681

(51) Int. Cl.
*C08L 23/16* (2006.01)
*C08L 23/14* (2006.01)
(Continued)

(52) U.S. Cl.
CPC .......... *C08L 23/16* (2013.01); *B29C 45/0001* (2013.01); *B29K 2023/065* (2013.01);
(Continued)

(58) Field of Classification Search
CPC .......... C08L 23/16; C08L 23/12; C08L 23/14; C08L 2207/02; C08L 2205/03
See application file for complete search history.

(56) References Cited

U.S. PATENT DOCUMENTS 9,096,752 B2 * 8/2015 Grestenberger ........ C08L 23/14
9,206,304 B2 * 12/2015 Lederer ................... C08L 23/10
(Continued)

FOREIGN PATENT DOCUMENTS

CN 101084268 A 12/2007
CN 103717667 A 4/2014
(Continued)

OTHER PUBLICATIONS

Applicant: Borealis AG; European Patent Application No. 18203681.4; "Polyolefin Composition With Improved Balance of Properties"; Extended European Search Report; dated Apr. 4, 2019; 7 pgs.
(Continued)

*Primary Examiner* — Rip A Lee
(74) *Attorney, Agent, or Firm* — Tarolli, Sundheim, Covell & Tummino LLP (57) ABSTRACT

The present invention is directed to a polyolefin composition comprising a blend of a heterophasic polypropylene composition and 5.0 to 30.0 wt % of an ethylene homo- or copolymer, the ethylene homo- or copolymer having a density of at least 941 kg/m³ and a melt flow rate $MFR_{21}$ of 1 to 10 g/10 min. The heterophasic polypropylene composition comprises a propylene homopolymer or a propylene ethylene random copolymer and an elastomeric ethylene propylene rubber, and is characterized by 75.0 to 95.0 wt % of a crystalline fraction having an ethylene content of up to 4.0 wt % and an $MFR_2$ of 0.1 to 100 g/10 min, and 5.0 to 25.0 wt % of a soluble fraction having an ethylene content of 10.0 to 70.0 wt % and an intrinsic viscosity of 1.0 to 4.0
(Continued)

dl/kg, wherein the crystalline fraction and the soluble fraction are determined in 1,2,4-trichlorobenzene at 40° C.

15 Claims, 1 Drawing Sheet

(51) Int. Cl.
    *B29C 45/00*     (2006.01)
    *B29K 23/00*     (2006.01)
    *B29K 105/00*     (2006.01)

(52) U.S. Cl.
    CPC ....... *B29K 2105/0094* (2013.01); *C08L 23/14* (2013.01); *C08L 2203/30* (2013.01); *C08L 2205/025* (2013.01); *C08L 2207/02* (2013.01); *C08L 2207/062* (2013.01)

(56) References Cited

U.S. PATENT DOCUMENTS

| | | | |
|---|---|---|---|
| 9,487,648 B2* | 11/2016 | Gahleitner | C08F 210/06 |
| 9,701,825 B2* | 7/2017 | Grestenberger | C08K 3/34 |
| 10,081,726 B2* | 9/2018 | Pukánszky | C08L 23/06 |
| 10,450,451 B2* | 10/2019 | Wang | C08F 210/06 |
| 11,053,379 B2* | 7/2021 | Grestenberger | C08L 23/12 |
| 11,091,620 B2* | 8/2021 | Valkier | C08L 23/12 |
| 2012/0115995 A1* | 5/2012 | Lederer | C08L 23/12 524/102 |
| 2014/0303308 A1* | 10/2014 | Grestenberger | C08L 23/10 525/240 |
| 2015/0099842 A1* | 4/2015 | Gahleitner | C08L 23/06 524/451 |
| 2016/0108291 A1* | 4/2016 | Masson | B32B 7/12 428/141 |
| 2016/0194486 A1 | 7/2016 | Sandholzer et al. | |
| 2017/0137617 A1* | 5/2017 | Wang | C08F 210/06 |
| 2018/0319967 A1* | 11/2018 | Lummerstorfer | C08L 23/12 |

FOREIGN PATENT DOCUMENTS

| | | | | |
|---|---|---|---|---|
| CN | 107250249 A | | 10/2017 | |
| CN | 107922695 A | | 4/2018 | |
| GB | 2568909 A | * | 6/2019 | .............. C08L 23/14 |
| WO | 2006/067023 A1 | | 6/2006 | |
| WO | 2013007650 A1 | | 1/2013 | |
| WO | 2013/026745 A1 | | 2/2013 | |
| WO | WO 2013/041507 A1 | * | 3/2013 | .............. C08L 23/10 |
| WO | WO 2016/070416 A1 | * | 5/2016 | .............. C08F 10/06 |
| WO | 2016/095225 A1 | | 6/2016 | |
| WO | WO 2016/095225 A1 | * | 6/2016 | .............. C08L 23/16 |
| WO | 2017/25268 A1 | | 2/2017 | |
| WO | 2017/207493 A1 | | 12/2017 | |
| WO | 2018/091684 A1 | | 5/2018 | |
| WO | 2018/122134 A1 | | 7/2018 | |

OTHER PUBLICATIONS

Castignolles, Patrice, et al., "Detection and quantification of branching in polyacrylates by size-exclusion chromatography (SEC) and melt-state 13C NMR Spectroscopy", Polymer 50 (2009) 2373-2383.
Filip, Xenia, et al., "Heteronuclear Decoupling Under Fast Mas By a Rotor-Synchronized Hahn-Echo Pulse Train", Journal of Magnetic Resonance 176 (2005) 239-243.
Griffin, John M., et al. "Low-Load Rotor-Synchronized Hahn-Echo Pulse Train (RS-HEPT) 1H Decoupling in Solid-State NMR:Factors Affecting Mas Spin-Echo Dephasing Times", Magn. Reson. Chem. 2007; 45:S198-S208.
Klimke, Katja, et al., "Optimisation and Application of Polyolefin Branch Quantification By Melt-State 13CNMR Spectroscopy", Macromol. Chem. Phys. 2006, 207, p. 382-395.
Oarkinson, Matthew, et al., "Effect of Branch Length on 13C NMR Relation Properties in Molten Poly[ethylene-co-(alpha-olefin)] Model Systems", Macromol. Chem, Phys 2007, 208-2128-2133.
Pollard, M. Pollard, et al., "Observation of Chain Branching in Polyethylene in the Solid State and Melt Via 13C NMR Spectroscopy and Melt NMR Relation Time Measurements", Macromolecules 2004, 37, 813-825.
Randall, James c., "A Review of High Resolution Liquid 13carbon Nuclear Magnetic Resonance Characterizations of Ethylene-Based Polymers", Journal of macromolecular science, C29():201 1989.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28,1128-1137.
Busico, Vincenzo, et al., "Full Assignment of the 13C NMR Spectra or Regioregular Polypropylenes: Methyl and Methylene Region", Macromolecules 1997, 30, 6251-6263.
Busico, Vincenzo, et al., "Microstructure of Polypropylene", Prog. Polym. Sci. 26 (2001) 443-533.
Cheng, et al., "13C NMR Analysis of Ethylene-Propylene Rubbers", Macromolecules 17, 1984, 1950-1955.
Kakugo, Masahiro, et al.,"13C NMR Determination of Monomer Sequence Distribution in Ethylene-Propylene Copolymers Prepared with d-TiC13-Al(C2H5)2 Cl" Macromolecules 1982, 15, 1150-1152.
Resconi, Luigi, et al., "Selectivity in Propane Polymerization With Metallocene Catalysts", Chem. Rev. 2000, 100, 1253-1345.
Singh, Gurmeet, et al., "Triad Sequence Determination of Ethylene-Propylene Copolymers—Application of Quantitative 13C NMRr", Polymer Testing 28 (2009) 475-479.
Wang, Wen-Jun, et al., "Structural Analysis of Ethylene/Propylene Copolymers Synthesized With a Constrained Geometry Catalyst", Macromolecules 2000, 33, 1157-1162.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
A. Kaye, et al.; "Definition of terms relating to the non-ultimate mechanical properties of polymers", Pure & Appl. Chem., vol. 70, No. 3, pp. 701-754, 1998.
Heino, E.L., et al.; "Rheological characterization of polyethylene fractions"; Neste Oy, Porvoo, Finland, Theor. Appl. Rheol., Proc. Int. Congr. Rheol., 11th (1992), 1, 360-362.
Heino, E.L.; "The influence of molecular structure on some rheological properties of polyethylene", Borealis Polymers Oy, Porvoo, Finland, Annual Transactions of the Nordic Rheology Society, 1995.
J. Brandup, et al.; Polymer Handbook, Fourth Edition, John Wiley & Sons, Inc.; Mar. 1999; 61 pgs.
B. Monrabal, et al.; "Soluble Fraction Analysis in Polypropylene: Characterization of the whole polymer, amorphous and crystalline fractions in a Quality Control Laboratory"; Polymer Char; 2014; pp. 18-23.
Taozai Tan, "Plastic Testing Technology", Aug. 31, 2013, pp. 148-153.
Applicant: Borealis AG; "Polyolefin Composition with Improved Balance of Properties"; Chinese Application No. 201980071474.6; Sep. 14, 2021; 12 pgs.

* cited by examiner

POLYOLEFIN COMPOSITION WITH IMPROVED BALANCE OF PROPERTIES

The present invention is directed to a polyolefin composition comprising a heterophasic polypropylene composition having an improved balance of desirable properties, i.e. high stiffness, high toughness, and high stress whitening resistance. The present invention is further directed to a moulded article comprising the polyolefin composition.

Heterophasic polypropylene compositions are known in the art. They are composed of a continuous propylene homopolymer and/or propylene random copolymer phase acting as matrix in which an elastomeric phase, e.g. an ethylene propylene rubber (EPR), is dispersed. Depending on the particular design of the heterophasic polypropylene composition various property profiles can be established. Factors of influence are the constitution of the matrix phase, the constitution of the dispersed phase, and the relative amounts thereof. As indicated already above, the matrix can be a propylene homopolymer and/or a propylene random copolymer. For the dispersed phase there are several options considering e.g. the type of monomer/comonomer, the amount of comonomer, and the molecular weight.

Heterophasic polypropylene compositions were designed to provide improved impact properties if compared to propylene random copolymers. The improved impact strength of heterophasic polypropylene compositions is attributed to the presence of the dispersed phase.

Also high stiffness is often desired. Given its high crystallinity, a propylene homopolymer (isotactic) has the highest stiffness. Insertion of a comonomer like in propylene ethylene random copolymers reduces stiffness by interrupting crystalline moieties but enhances impact properties. Insertion of a rubber phase resulting in a heterophasic polypropylene compositions further reduces stiffness but—as indicated already above—improves impact strength.

Stress whitening is a known phenomenon which occurs when tensile or impact loading is applied to a moulded article comprising a polypropylene composition. The term "stress whitening" indicates a white line appearing along the bend or curve when a material is stressed by bending or punching operations. The stress whitening accordingly deteriorates the aesthetic qualities of the moulded article.

For certain applications like battery cases a moulded article like an injection moulded article with high impact strength, high stiffness and good stress whitening resistance is desirable.

It is known that stress whitening can be reduced by adding crystalline polyethlylene into a heterophasic polypropylene composition. In such compositions the crystalline polyethylene components are situated in the core of the ethylene propylene rubber particles.

WO 2006/067023 A1 discloses a heterophasic polypropylene composition comprising 50 to 77 wt % of a crystalline propylene polymer having an amount of isotactic pentads (mmmm), measured by $^{13}$C-NMR on the fraction insoluble in xylene at 25° C., higher than 97.5 mol % and a polydispersity index of 4 to 10, 13 to 28 wt % of an elastomeric copolymer of ethylene and propylene, the copolymer having an ethylene content of 30 to 70 wt % and being partially soluble in xylene at ambient temperature, the polymer fraction soluble in xylene at ambient temperature having an intrinsic viscosity of 2 to 4 dl/g, and 10 to 22 wt % of polyethylene having an intrinsic viscosity value ranging of 1 to 3 dl/g, wherein the elastomeric copolymer of ethylene and propylene and the polyethylene make up together at least 25 wt % of the composition.

The usual behaviour of a heterophasic polypropylene composition upon addition of polyethylene, in particular high-density polyethylene having a density of at least 941 kg/m$^3$, is that impact strength and stress whitening resistance are improved, however, stiffness is reduced, i.e. the blends have lower stiffness than the heterophasic polypropylene composition before addition of polyethylene.

It is accordingly a difficult task to provide a polypropylene composition with sufficient impact properties and stress whitening resistance which has at the same time acceptable stiffness.

Hence, there is still a need for providing a polypropylene composition having an improved balance of desirable properties, i.e. high stiffness, high toughness, and high stress whitening resistance.

The present invention is based on the finding that the object can be solved by provision of a polyolefin composition comprising a heterophasic polypropylene composition and a high molecular weight high density ethylene homo- or copolymer.

Accordingly, the present invention is in one aspect directed to a polyolefin composition comprising a blend of
(A) a heterophasic polypropylene composition comprising
   a propylene homopolymer or a propylene ethylene random copolymer and
   an elastomeric ethylene propylene rubber, and
(B) 5.0 to 30.0 wt % of an ethylene homo- or copolymer, based on the weight of the polyolefin composition
wherein the heterophasic polypropylene composition is characterized by
   (a1) 75.0 to 95.0 wt % of a crystalline fraction (CF) having an ethylene content of up to 4.0 wt % and an MFR$_2$ of 0.1 to 100 g/10 min and,
   (a2) 5.0 to 25.0 wt % of a soluble fraction (SF) having an ethylene content of 10.0 to 70.0 wt % and an intrinsic viscosity of 1.0 to 4.0 dl/g,
   wherein the crystalline fraction (CF) and the soluble fraction (SF) are
   determined in 1,2,4-trichlorobenzene at 40° C., and
   wherein the ethylene homo- or copolymer has a density of at least 941 kg/m$^3$ and a melt flow rate MFR$_{21}$ of 1.0 to 7.5 g/10 min.

Propylene Homopolymer or Propylene Ethylene Random Copolymer

The expression propylene homopolymer used herein relates to a polypropylene that consists substantially, i.e. at least 99.0 wt %, preferably of at least 99.5 wt %, more preferably of at least 99.8 wt %, of propylene units. In a preferred embodiment only propylene is used as monomer in polymerization. In a preferred embodiment only propylene units are detectable in the propylene homopolymer. Further, it is appreciated that the homopolymer of propylene is a linear polypropylene.

The expression propylene ethylene random copolymer is known to the skilled person. As far as the randomness is concerned, the ethylene content cannot be too high. The ethylene content of a propylene ethylene random copolymer is usually below 10 mol %. Further, it is appreciated that the propylene ethylene random copolymer is a linear polypropylene.

The ethylene content of a propylene ethylene random copolymer according to the present invention is preferably 4.0 wt % or below, more preferably 2.0 wt % or below.

The propylene homopolymer or propylene ethylene random copolymer is part of the matrix phase of the heterophasic polypropylene composition. Preferably, the matrix phase comprises at least 90.0 wt %, more preferably at least 95.0 wt %, still more preferably consists, of the propylene homopolymer or propylene ethylene random copolymer.

The propylene homopolymer or propylene ethylene random copolymer makes up the majority of the heterophasic polypropylene composition.

Preferably, the amount of the propylene homopolymer or propylene ethylene random copolymer in the heterophasic polypropylene composition is at least 70.0 wt %, more preferably at least 75.0 wt %. Preferably, the amount of the propylene homopolymer or propylene ethylene random copolymer in the heterophasic polypropylene composition is 95.0 wt % or below.

The propylene homopolymer or propylene ethylene random copolymer preferably has a melting temperature $T_m$ of at least 155° C. The melting temperature $T_m$ of the propylene homopolymer or propylene ethylene random copolymer will be usually not higher than 170° C.

The propylene homopolymer or propylene ethylene random copolymer preferably has a melt flow rate $MFR_2$ of 0.1 to 100 g/10 min.

The propylene homopolymer or propylene ethylene random copolymer is preferably produced in the presence of a single-site catalyst (SSC). Single-site catalysts (SSC) like metallocene catalysts are known to the skilled person. Suitable single-site catalysts (SSC) are e.g. disclosed in WO 2013/007650 A1 and in WO 2018/122134 A1.

The propylene homopolymer or propylene ethylene random copolymer is preferably a propylene homopolymer.

Elastomeric Ethylene Propylene Rubber (EPR)

The expression elastomeric ethylene propylene rubber is known to the skilled person, often abbreviated as EPR. The relative amounts of ethylene and propylene can vary to a wide extent and are such that still the elastomeric properties are maintained, i.e. such that not a random copolymer is obtained.

The ethylene content of the elastomeric ethylene propylene rubber according to the present invention is preferably at least 10.0 wt %. The ethylene content of the elastomeric ethylene propylene rubber according to the present invention is preferably 70.0 wt % or below, more preferably 50 wt % or below, still more preferably 30 wt % or below.

The elastomeric ethylene propylene rubber is part of the elastomeric phase of the heterophasic polypropylene composition which is dispersed in the matrix phase.

Preferably, the elastomeric phase comprises at least 90.0 wt %, more preferably at least 95.0 wt %, still more preferably consists, of the elastomeric ethylene propylene rubber.

Preferably, the amount of the elastomeric ethylene propylene rubber in the heterophasic polypropylene composition is at least 5.0 wt %. Preferably, the amount of the elastomeric ethylene propylene rubber in the heterophasic polypropylene composition is 25.0 wt % or below, more preferably 15 wt % or below.

The elastomeric ethylene propylene rubber according to the present invention is preferably produced in the presence of a single-site catalyst (SSC).

Heterophasic Polypropylene Composition

The expression heterophasic polypropylene composition is known to the skilled person to comprise a matrix phase and an elastomeric phase dispersed therein. In the polyolefin composition according to the present invention the propylene homopolymer or propylene ethylene random copolymer is part of or is the matrix phase, while the elastomeric ethylene propylene rubber is part of or is the elastomeric phase dispersed therein.

The heterophasic polypropylene composition according to the present invention is preferably produced by sequential polymerization wherein in one step the propylene homopolymer or propylene ethylene random copolymer is produced, and in a subsequent step the elastomeric ethylene propylene rubber is produced in the presence of the propylene homopolymer or propylene ethylene random copolymer.

Accordingly, the elastomeric ethylene propylene rubber, or the elastomeric fraction, respectively, is usually not present as a separate fraction. Since in a heterophasic polypropylene composition the matrix phase and the elastomeric phase usually cannot exactly be divided from each other, one cannot directly measure amount and properties of the elastomeric ethylene propylene rubber, or the elastomeric phase, respectively.

In order to characterize the matrix phase and the elastomeric phase of a heterophasic polypropylene composition several methods are known. One method is the extraction of a xylene cold solubles (XCS) fraction, thus separating a xylene cold solubles (XCS) fraction from a xylene cold insoluble (XCI) fraction. It is known that the xylene cold solubles (XCS) fraction of a heterophasic polypropylene composition largely corresponds to the elastomeric phase. It may, however, contain small parts of the matrix phase, e.g. around 1.0 wt %. The xylene extraction is especially suitable for heterophasic polypropylene compositions with a highly crystalline matrix phase such as propylene homopolymer matrix phase but is also applied to propylene ethylene random copolymer matrix phases.

Another method is the separation of a crystalline fraction and a soluble fraction with the CRYSTEX QC method using 1,2,4-trichlorobenzene (TCB) as solvent. This method is described below in the measurement methods section. In this method, a crystalline fraction (CF) and a soluble fraction (SF) are separated from each other. The crystalline fraction (CF) largely corresponds to the matrix phase and contains only a small part of the elastomeric phase, while the soluble fraction (SF) largely corresponds to the elastomeric phase and contains only a small part of the matrix phase.

Due to the differences in the separation methods using extraction by xylene and by 1,2,4-trichlorobenzene, the properties of XCS/XCI fractions on the one hand and soluble/crystalline (SF/CF) fractions on the other hand are not exactly the same, but are similar.

As indicated above, the heterophasic polypropylene composition according to the present invention is characterized by a soluble fraction (SF) determined in 1,2,4-trichlorobenzene at 40° C. in the range of 5.0 to 25.0 wt %, based on the total weight of the heterophasic polypropylene composition, and the soluble fraction (SF) has an ethylene content C2(SF) in the range of 10.0 to 70.0 wt % and an intrinsic viscosity of 1.0 to 4.0 dl/g.

Preferably, the amount of the soluble fraction (SF) of the heterophasic polypropylene composition is 15.0 wt % or less. Preferably, the heterophasic polypropylene composition comprises 5.0 to 15.0 wt % of the soluble fraction (SF). Preferably, the amount of the soluble fraction (SF) of the heterophasic polypropylene composition is at least 7.0 wt %.

Preferably, the soluble fraction (SF) has an ethylene content C2(SF) of 50.0 wt % or less, more preferably of 30.0 wt % or less. Preferably, the soluble fraction (SF) has an ethylene content of 10.0 to 30.0 wt %. Preferably, the soluble fraction (SF) has an ethylene content C2(SF) of at least 12.0 wt %.

Preferably, the soluble fraction (SF) has an intrinsic viscosity of 2.0 to 4.0 dl/g.

As indicated above, the heterophasic polypropylene composition according to the present invention is characterized by a crystalline fraction (CF) determined in 1,2,4-trichlorobenzene at 40° C. in the range of 75.0 to 95.0 wt %, based on the total weight of the heterophasic polypropylene composition, having an ethylene content of up to 4.0 wt % and an $MFR_2$ of 0.1 to 100 g/10 min.

Preferably, the amount of the crystalline fraction (CF) of the heterophasic polypropylene composition is at least 85.0 wt %. Preferably, the heterophasic polypropylene composition comprises 85.0 to 95.0 wt % of the crystalline fraction (CF). Preferably, the amount of the crystalline fraction (CF) of the heterophasic polypropylene composition is 93.0 wt % or less.

Preferably, the crystalline fraction (CF) has an ethylene content C2(CF) of 2.0 wt % or less, more preferably of 1.5 wt % or less. The ethylene content of the soluble fraction C2(CF) will be usually at least 0.0 wt %.

The heterophasic polypropylene composition according to the present invention is preferably also characterized by a xylene cold solubles (XCS) fraction in the range of 5.0 to 25.0 wt %, more preferably 5.0 to 15.0 wt %, based on the total weight of the heterophasic polypropylene composition.

The heterophasic polypropylene composition according to the present invention is preferably also characterized by an ethylene content of the xylene cold solubles (XCS) fraction C2(XCS) in the range of 10.0 to 70.0 wt %, preferably 10.0 to 30.0 wt %.

The heterophasic polypropylene composition according to the present invention is preferably also characterized by an intrinsic viscosity (IV) measured according to DIN ISO1628/1 (in decalin at 135° C.) of the xylene cold solubles (XCS) fraction IV(XCS) in the range of 1.0 to 4.0 dl/g, more preferably 2.0 to 4.0 dl/g.

The heterophasic polypropylene composition preferably has a melt flow rate $MFR_2$ of 1.0 to 50.0 g/10 min, more preferably of 2.0 to 20.0 g/10 min, still more preferably of 3.0 to 10 g/10.0 min.

It is furthermore preferred that the heterophasic polypropylene composition has at least one melting temperature $T_{m1}$ measured by differential scanning calorimetry (DSC) with $T_{m1}$ being higher than 150° C. The melting temperature $T_{m1}$ of the heterophasic polypropylene composition will be usually not higher than 170° C.

The heterophasic polypropylene composition according to the present invention may comprise usual additives, preferably in a total amount of not more than 5.0 wt % based on the total weight of the heterophasic polypropylene composition.

The heterophasic polypropylene composition according to the present invention may comprise an antioxidant, such as sterically hindered phenol, phosphorus-based antioxidant, sulphur-based antioxidant, nitrogen-based antioxidant, or mixtures thereof. In particular, a mixture of pentaerythritol tetrakis(3-(3,5-di-tert-butyl-4-hydroxyphenyl)propionate) and tris(2,4-di-tert-butylphenyl)phosphite may be used as antioxidant (Irganox B 215 or Irganox B 225).

The heterophasic polypropylene composition according to the present invention may further comprise an antistatic agent, such as calcium stearate, sodium stearate or zinc stearate.

Ethylene Homo- or Copolymer (HDPE)

The skilled person knows ethylene homo- and copolymers.

Ethylene homopolymers may be produced in a so-called high pressure process without application of a catalyst resulting in a branched material of relatively low density (usually about 910-940 kg/m$^3$), so-called low-density polyethylene, usually abbreviated as LDPE.

Ethylene homopolymers may also be produced in a so-called low pressure process with application of a suitable catalyst, like a Ziegler-Natta catalyst, resulting in a material without considerable branching of relatively high density (usually about 941-970 kg/m$^3$), so-called high-density polyethylene, usually abbreviated as HDPE.

Ethylene copolymers are usually produced in a low pressure process with application of a suitable catalyst, like a Ziegler-Natta catalyst, resulting in a material without considerable branching apart from the branches introduced by the side chains of the comonomers (α-olefins). The density is usually lower than that of HDPE (usually about 915-925 kg/m$^3$), so-called linear low-density polyethylene, usually abbreviated as LLDPE.

As indicated above, the polyolefin composition according to the present invention comprises 5.0 to 30.0 wt % of an ethylene homo- or copolymer, based on the weight of the polyolefin composition, having a density of at least 941 kg/m$^3$, preferably at least 950 kg/m$^3$, and a melt flow rate $MFR_{21}$ of 1.0 to 7.5 g/10 min, preferably 1.5 to 7.0 g/10 min, more preferably 2.0 to 6.5 g/10 min, still more preferably 3.0 to 6.5 g/10 min. The density will be usually below 970 kg/m$^3$.

Hence, the ethylene homo- or copolymer according to the present invention has a density which is typical for HDPE and has a rather low melt flow rate value corresponding to a rather high molecular weight. The ethylene homo- or copolymer according to the present invention is accordingly a high molecular weight high density ethylene polymer and is herein addressed as HDPE even if it covers ethylene homopolymers and ethylene copolymers.

Preferably, the ethylene homo- or copolymer is an ethylene copolymer and comprises a copolymer of ethylene and a, i.e. at least one, $C_4$ to $C_{12}$ α-olefin.

Preferably, the ethylene copolymer comprises a copolymer of ethylene and a comonomer seleted from the group consisting of 1-butene, 1-hexene, 1-octene, and mixtures thereof, more preferably seleted from the group consisting of 1-butene, 1-hexene, and mixtures thereof.

As far as mixtures of comonomers are concerned, the ethylene copolymer preferably comprises more than one fraction, wherein each fraction is produced in its own polymerization step, and wherein in each fraction only one type of comonomer is present. This covers also ethylene copolymers comprising one or more ethylene copolymer fractions and one or more ethylene homopolymer fractions. Hence, the ethylene copolymer according to the present invention is a copolymer since at least one fraction thereof is a copolymer, however, ethylene homopolymer fractions may also be present.

Preferably, the ethylene copolymer comprises one homopolymer fraction and one copolymer fraction that comprises 1-hexene as comonomer. In this regard it is further preferred that the homopolymer fraction has a lower weight average molecular weight than the copolymer fraction.

The comonomer content of the ethylene copolymer is preferably between 0.0 and 0.7 mol %, more preferably between 0.02 and 0.5 mol %, even more preferably between 0.05 and 0.4 mol %.

As indicated above, the rather low melt flow rate value corresponds to a rather high molecular weight of the ethylene homo- or copolymer. Accordingly, the weight average molecular weight $M_w$. of the ethylene homo- or copolymer is preferably at least 250.000 g/mol, more preferably at least 300.000 g/mol, even more preferably at least 350.000 g/mol. The weight average molecular weight $M_w$. of the ethylene homo- or copolymer is preferably 600.000 g/mol or below, more preferably 500.000 g/mol or below.

Preferably, the ethylene homo- or copolymer has a molecular weight distribution $M_w/M_n$ of 25.0 to 50.0, more preferably 30.0 to 45.0, wherein $M_n$ is the number average molecular weight.

The ethylene homo- or copolymer has a complex viscosity at 0.05 rad/s $eta_{0.15}$ of 750 kPa-s to 1900 kPa-s, preferably 800 kPa-s to 1700 kPa-s, more preferably 850 kPa-s to 1600 kPa-s, and most preferably 900 kPa-s to 1500 kPa-s.

The viscosity $eta_{0.05}$ is measured at a low frequency and thus a low shear stress and is proportional to the molecular weight of the composition. It can thus be seen as a measure for the molecular weight of the polyethylene composition.

The ethylene homo- or copolymer preferably has a complex viscosity at 300 rad/s $eta_{300}$ of 750 Pa-s to 2000 Pa-s, more preferably 900 Pa-s to 1900 Pa-s, and most preferably 1000 Pa-s to 1800 Pa-s.

The viscosity $eta_{300}$ is measured at a high frequency and thus a high shear stress and is inversely proportional to the flowability of the composition. It can thus be seen as a measure for the processability of the polyethylene composition.

The ethylene homo- or copolymer is preferably produced by a Zieger-Natta catalyst.

The ethylene homo- or copolymer is preferably produced in a multistage polymerization process, the multistage process preferably comprising the following steps:
  a) polymerizing ethylene in the presence of a solid Ziegler-Natta catalyst component in a first reactor for obtaining a first intermediate material,
  b) transferring the first intermediate material to a second reactor
     (i) feeding ethylene to the second reactor
     (ii) further polymerizing the first intermediate material for obtaining a second intermediate material, the second intermediate material having a melt flow rate $MFR_2$ of 5 to 250 g/10 min; and
  c) transferring the second intermediate material to a third reactor
     (i) feeding ethylene to the third reactor
     (ii) further polymerizing the second intermediate material for obtaining a third intermediate material, the third intermediate material having a melt flow rate $MFR_2$ of 80 to 250 g/10 min;
  d) transferring the third intermediate material to a fourth reactor
     (i) feeding ethylene and comonomer selected from alpha-olefins having from 4 to 12 carbon atoms to the fourth reactor
     (ii) further polymerizing the third intermediate material in the presence of a silane type external donor.

The first, second and the third reactor are preferably loop reactors. The fourth reactor is preferably a gas phase reactor.

The ethylene homo- or copolymer according to the present invention may comprise usual additives, preferably in a total amount of not more than 5.0 wt % based on the total weight of the ethylene homo- or copolymer. As regards the type of possible additives it is referred to the respective disclosure in connection with the heterophasic polypropylene composition above.

Polyolefin Composition

As indicated above, the polyolefin composition according to the present invention comprises, preferably consists of, a blend of the heterophasic polypropylene composition described in detail above and of 5.0 to 30.0 wt % of the ethylene homo- or copolymer described in detail above, based on the weight of the polyolefin composition. The amount of the heterophasic polypropylene composition is preferably 70.0 to 95.0 wt %, based on the weight of the polyolefin composition.

The blend can be obtained in the usual manner, e.g. in an extruder. Preferably, the polyolefin composition according to the present invention has a Charpy notched impact strength NIS at +23° C. measured according to ISO 179 of at least 20.0 kJ/m$^2$.

Preferably, the polyolefin composition according to the present invention has a flexural modulus measured according to ISO 178 of at least 1200 MPa.

Preferably, the polyolefin composition according to the present invention has a stress whitening intensity (measured as described herein) of below 2.0, more preferably below 1.5.

Articles

The present invention is in a second aspect directed to a moulded article comprising the polyolefin composition according to the first aspect of the present invention described above, including all its preferred embodiments.

Preferably, the moulded article is an injection moulded article.

In the following the present invention is further illustrated by means of examples.

EXAMPLES

1. Definitions/Measuring Methods

The following definitions of terms and determination methods apply for the above general description of the invention as well as to the below examples unless otherwise defined.

Ethylene Content

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probe head at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent {8}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}C\{^1H\}$ spectra. This method was chosen for its robust nature and ability to account for the presence of regiodefects when needed. Integral regions were slightly adjusted to increase applicability across the whole range of encountered comonomer contents. For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H-I_G+0.5(I_C+I_D))$$

using the same notation used in the article of Wang et al. {6}. Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

BIBLIOGRAPHIC REFERENCES

1) Busico, V., Cipullo, R., Prog. Polym. Sci. 26 (2001) 443.
2) Busico, V., Cipullo, R., Monaco, G., Vacatello, M., Segre, A. L., Macromolecules 30 (1997) 6251.
3) Zhou, Z., Kuemmerle, R., Qiu, X., Redwine, D., Cong, R., Taha, A., Baugh, D. Winniford, B., J. Mag. Reson. 187 (2007) 225.
4) Busico, V., Carbonniere, P., Cipullo, R., Pellecchia, R., Severn, J., Talarico, G., Macromol. Rapid Commun. 2007, 28, 1128.
5) Resconi, L., Cavallo, L., Fait, A., Piemontesi, F., Chem. Rev. 2000, 100, 1253.
6) Wang, W-J., Zhu, S., Macromolecules 33 (2000), 1157.
7) Cheng, H. N., Macromolecules 17 (1984), 1950.
8) Singh, G., Kothari, A., Gupta, V., Polymer Testing 285 (2009), 475.
9) Kakugo, M., Naito, Y., Mizunuma, K., Miyatake, T. Macromolecules 15 (1982) 1150.
10) Randall, J. Macromol. Sci., Rev. Macromol. Chem. Phys. 1989, C29, 201.
11) Resconi, L., Cavallo, L., Fait, A., Piemontesi, F., Chem. Rev. 2000, 100, 1253.

Hexene Content of HDPE

Quantitative $^{13}C\{^1H\}$ NMR spectra recorded in the molten-state using a Bruker Advance III 500 NMR spectrometer operating at 500.13 and 125.76 MHz for $^1H$ and $^{13}C$, respectively. All spectra were recorded using a $^{13}C$ optimized 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {1, 2, 6}. Standard single-pulse excitation was employed utilizing the transient NOE at short recycle delays of 3 s {1, 3} and the RSHEPT decoupling scheme {4, 5}. A total of 16384 transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (6+) at 30.00 ppm {9}.

Characteristic signals corresponding to the incorporation of 1-hexene were observed {9} and all contents calculated with respect to all other monomers present in the polymer.

$$H=I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total}=H$$

Characteristic signals resulting from saturated end-groups were observed. The content of such saturated end-groups was quantified using the average of the integral of the signals at 22.84 and 32.23 ppm assigned to the 2s and 3s sites respectively:

$$S=(\tfrac{1}{2})*(I_{2S}+I_{3S})$$

The relative content of ethylene was quantified using the integral of the bulk methylene ($\delta$+) signals at 30.00 ppm:

$$E=(\tfrac{1}{2})*I_{\delta+}$$

The total ethylene comonomer content was calculated based on the bulk methylene signals and accounting for ethylene units present in other observed comonomer sequences or end-groups:

$$E_{total}=E+(\tfrac{5}{2})*B+(\tfrac{3}{2})*S$$

The total mole fraction of 1-hexene in the polymer was then calculated as:

$$fH=(H_{total}/(E_{total}+H_{total})$$

The total comonomer incorporation of 1-hexene in mole percent was calculated from the mole fraction in the usual manner:

$$H[\text{mol \%}]=100*fH$$

The total comonomer incorporation of 1-hexene in weight percent was calculated from the mole fraction in the standard manner:

$$H[\text{wt \%}]=100*(fH*84.16)/((fH*84.16)+((1-fH)*28.05))$$

1) Klimke, K., Parkinson, M., Piel, C., Kaminsky, W., Spiess, H. W., Wilhelm, M., Macromol. Chem. Phys. 2006; 207:382.
2) Parkinson, M., Klimke, K., Spiess, H. W., Wilhelm, M., Macromol. Chem. Phys. 2007; 208:2128.

3) Pollard, M., Klimke, K., Graf, R., Spiess, H. W., Wilhelm, M., Sperber, O., Piel, C., Kaminsky, W., Macromolecules 2004; 37:813.
4) Filip, X., Tripon, C., Filip, C., J. Mag. Reson. 2005, 176, 239.
5) Griffin, J. M., Tripon, C., Samoson, A., Filip, C., and Brown, S. P., Mag. Res. in Chem. 2007, 45, S1, S198.
6) Castignolles, P., Graf, R., Parkinson, M., Wilhelm, M., Gaborieau, M., Polymer 50 (2009) 2373.
7) Zhou, Z., Muemmerle, R., Qiu, X., Redwine, D., Cong, R., Taha, A., Baugh, D. Winniford, B., J. Mag. Reson. 2007, 187, 225.
8) Busico, V., Carbonniere, P., Cipullo, R., Pellecchia, R., Severn, J., Talarico, G., Macromol. Rapid Commun. 2007, 28, 1128.
9) J. Randall, Macromol. Sci., Rev. Macromol. Chem. Phys. 1989, C29, 201.

Density

Density is measured according to ISO 1183-1—method A (2004). Sample preparation is done by compression moulding in accordance with ISO 1872-2:2007.

Intrinsic Viscosity (IV)

Intrinsic viscosity (IV) is measured according to DIN ISO 1628/1, October 1999 in decalin at 135° C.

Melt Flow Rate

Melt flow rate $MFR_2$ of polyethylene is determined according to ISO 1133 at 190° C. under a load of 2.16 kg. Melt flow rate $MFR_5$ of polyethylene is determined according to ISO 1133 at 190° C. under a load of 5.0 kg. Melt flow rate $MFR_{21}$ of polyethylene is determined according to ISO 1133 at 190° C. under a load of 21.6 kg. Melt flow rate $MFR_2$ of polypropylene is determined according to ISO 1133 at 230° C. under a load of 2.16 kg.

Soluble and Crystalline Fraction (SF, CF)

The soluble fraction (SF) and the crystalline fraction (CF) of the composition as well as ethylene content and intrinsic viscosity of the respective fractions were analyzed by the CRYSTEX QC, Polymer Char (Valencia, Spain).

The crystalline and soluble fractions are separated through temperature cycles of dissolution at 160° C., crystallization at 40° C. and re-dissolution in 1,2,4-trichlorobenzene (1,2,4-TCB) at 160° C. Quantification of SF and CF and determination of ethylene content (C2) are achieved by means of an infrared detector (IR4) and an online 2-capillary viscometer which is used for the determination of the intrinsic viscosity (IV).

The IR4 detector is a multiple wavelength detector detecting IR absorbance at two different bands (CH3 and CH2) for the determination of the concentration and the ethylene content in ethylene-propylene copolymers. IR4 detector is calibrated with series of 8 ethylene-propylene copolymers with known ethylene content in the range of 2 wt % to 69 wt % (determined by $^{13}$C-NMR) and various concentration between 2 and 13 mg/ml for each used ethylene-propylene copolymer used for calibration. The amounts of the soluble fraction (SF) and the crystalline fraction (CF) are correlated through the XS calibration to the "xylene cold soluble" (XCS) quantity and respectively xylene cold insoluble (XCI) fractions, determined according to standard gravimetric method as per ISO16152. XS calibration is achieved by testing various ethylene-propylene copolymers with XS content in the range 2-31 wt %. The intrinsic viscosity (IV) of the parent ethylene-propylene copolymer and its soluble and crystalline fractions are determined with a use of an online 2-capillary viscometer and is correlated to corresponding IV's determined by standard method in decalin according to ISO 1628. Calibration is achieved with various ethylene-propylene copolymers with IV=2-4 dl/g.

A sample of the composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

A defined volume of the sample solution is injected into the TREF column filled with inert support (column filled with inert material e.g. glass beads) where the crystallization of the sample and separation of the soluble fraction from the crystalline part is taking place. This process is repeated two times. During the first injection the whole sample is measured at high temperature, determining the IV [d/g] and the C2 [wt %] of the composition. During the second injection the soluble fraction (at low temperature) and the crystalline fraction (at high temperature) with the crystallization cycle are measured (wt % SF, wt % C2, IV). (see Del Hierro, P.; Ortin, A.; Monrabal, B.; 'Soluble Fraction Analysis in polypropylene, The Column Advanstar Publications, February 2014. Pages 18-23).

Xylene Cold Solubles (XCS)

The xylene cold solubles content is measured at 25° C. according to ISO 16152, first edition; 2005-07-01. The part which remains insoluble is the xylene cold insoluble (XCI) fraction.

Molecular Weight

Number average molecular weight ($M_n$), weight average molecular weight ($M_w$) and polydispersity ($M_w/M_n$) are determined by Gel Permeation Chromatography (GPC) according to the following methods:

Heterophasic Polypropylene Composition

The weight average molecular weight $M_w$. and the polydispersity ($M_w/M_n$, wherein $M_n$ is the number average molecular weight and $M_w$ is the weight average molecular weight) is measured by a method based on ISO 16014-1:2003 and ISO 16014-4:2003. A Waters Alliance GPCV 2000 instrument, equipped with refractive index detector and online viscometer was used with 3×TSK-gel columns (GMHXL-HT) from TosoHaas and 1,2,4-trichlorobenzene (TCB, stabilized with 200 mg/L 2,6-di tert butyl-4-methylphenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

HDPE

Molecular weight averages ($M_z$, $M_w$ and $M_n$), Molecular weight distribution (MWD) and its broadness, described by polydispersity index, PDI=$M_w/M_n$ (wherein $M_n$ is the number average molecular weight and $M_w$ is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

-continued $$M_w = \frac{\sum_{i=1}^{N}(A_i \times M_i)}{\sum_{i=1}^{N} A_i} \quad (2)$$

$$M_z = \frac{\sum_{i=1}^{N}(A_i \times M_i^2)}{\sum_{i=1}^{N}(A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As mobile phase 1,2,4-trichlorobenzene (TCB) stabilized with 250 mg/L 2,6-Di tert butyl-4-methyl-phenol was used. The chromatographic system was operated at 160° C. and at a constant flow rate of 1 mL/min. 200 μL of sample solution was injected per analysis. Data collection was performed using either Agilent Cirrus software version 3.3 or Polymer-Char GPC-IR control software.

The column set was calibrated using universal calibration (according to ISO 16014-2:2003) with 19 narrow MWD polystyrene (PS) standards in the range of 0.5 kg/mol to 11500 kg/mol. The PS standards were dissolved at room temperature over several hours. The conversion of the polystyrene peak molecular weight to polyolefin molecular weights is accomplished by using the Mark Houwink equation and the following Mark Houwink constants:
$K_{PS}=19\times10^{-3}$ mL/g, $\alpha_{PS}=0.655$
$K_{PE}=39\times10^{-3}$ mL/g, $\alpha_{PE}=0.725$ A third order polynomial fit was used to fit the calibration data.

All samples were prepared in the concentration range of around 0.1 mg/ml and dissolved at 160° C. for 6 hours for PE in fresh distilled TCB stabilized with 1000 ppm Irgafos168 under continuous gentle shaking.

Rheological Parameters

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, η*, the dynamic shear viscosity, η', the out-of-phase component of the complex shear viscosity, η" and the loss tangent, tan η, which can be expressed as follows:

$$G'=\sigma_0/\gamma_0 \cos\delta [Pa] \quad (3)$$

$$G''=\sigma_0/\gamma_0 \sin\delta [Pa] \quad (4)$$

$$G^*=G'+iG'' [Pa] \quad (5)$$

$$\eta^*=\eta'-i\eta'' [Pa \cdot s] \quad (6)$$

$$\eta'=G''/\omega [Pa \cdot s] \quad (7)$$

$$\eta''=G'/\omega [Pa \cdot s] \quad (8)$$

The determination of so-called Shear Thinning Index, which correlates with MWD and is independent of Mw, is done as described in equation 9.

$$SHI_{(x/y)}=(Eta^* \text{ for } (G^*=x\ kPa))/(Eta^* \text{ for } (G^*=y\ kPa)) \quad (9)$$

For example, the SHI(2.7/210) is defined by the value of the complex viscosity, in Pa·s, determined for a value of G* equal to 2.7 kPa, divided by the value of the complex viscosity, in Pa·s, determined for a value of G* equal to 210 kPa.

The values of storage modulus (G'), loss modulus (G"), complex modulus (G*) and complex viscosity (η*) were obtained as a function of frequency (ω).

Thereby, e.g. $\eta^*_{300rad/s}$ (eta*$_{300rad/s}$) is used as abbreviation for the complex viscosity at the frequency of 300 rad/s and $\eta^*_{0.05rad/s}$ (eta*$_{0.05rad/s}$) is used as abbreviation for the complex viscosity at the frequency of 0.05 rad/s.

The loss tangent tan (delta) is defined as the ratio of the loss modulus (G") and the storage modulus (G') at a given frequency. Thereby, e.g. $\tan_{0.05}$ is used as abbreviation for the ratio of the loss modulus (G") and the storage modulus (G') at 0.05 rad/s and $\tan_{300}$ is used as abbreviation for the ratio of the loss modulus (G") and the storage modulus (G') at 300 rad/s.

The elasticity balance $\tan_{0.05}/\tan_{300}$ is defined as the ratio of the loss tangent $\tan_{0.05}$ and the loss tangent $\tan_{300}$.

REFERENCES

[1] "Rheological characterization of polyethylene fractions", Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362.

[2] "The influence of molecular structure on some rheological properties of polyethylene", Heino, E. L., *Borealis* Polymers Oy, Porvoo, Finland, Annual Transactions of the Nordic Rheology Society, 1995.

[3] "Definition of terms relating to the non-ultimate mechanical properties of polymers", Pure & Appl. Chem., Vol. 70, No. 3, pp. 701-754, 1998.

Glass Transition Temperature ($T_g$) and Storage Modulus (G')

The glass transition temperature $T_g$ and the storage modulus G'(23° C.) are determined by dynamic mechanical analysis (DMA) according to ISO 6721-7. The measurements are done in torsion mode on compression moulded samples (40×10×201.0 mm³) between −100° C. and +150° C. with a heating rate of 2° C./min and a frequency of 1 Hz.

Melting and Crystallization Temperature ($T_m$, $T_c$), Melt Enthalpy ($H_m$)

Melting temperature ($T_m$), crystallization temperature ($T_c$), and melt enthalpy ($H_m$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. The crystallization temperature ($T_c$) is determined from the cooling step, while melting temperature ($T_m$) and melting enthalpy ($H_m$) are determined from the second heating step. The crystallinity is calculated from the melting enthalpy by assuming an $H_m$-value of 209 J/g for a fully crystalline polypropylene (see Brandrup, J., Immergut, E. H., Eds. Polymer Handbook, 3rd ed. Wiley, New York, 1989; Chapter 3).

Charpy Notched Impact Strength

Charpy notched impact strength is determined according to ISO 179/1 eA at 23° C. and at −20° C. by using injection moulded test specimens as described in EN ISO 1873-2 (80×10×4 mm³).

Flexural Modulus

Flexural modulus is determined according to ISO 178:2010/Amd.1:2013 on injection molded specimens prepared in accordance with ISO 294-1:1996 (80×10×4 mm³).

Transparency, Haze and Clarity

Transparency, haze and clarity were determined according to ASTM D1003-00 on injection molded plaques prepared in accordance with EN ISO 1873-2 using a melt temperature of 200° C. (60×60×1.0 mm³).

Stress Whitening

Figure 1:
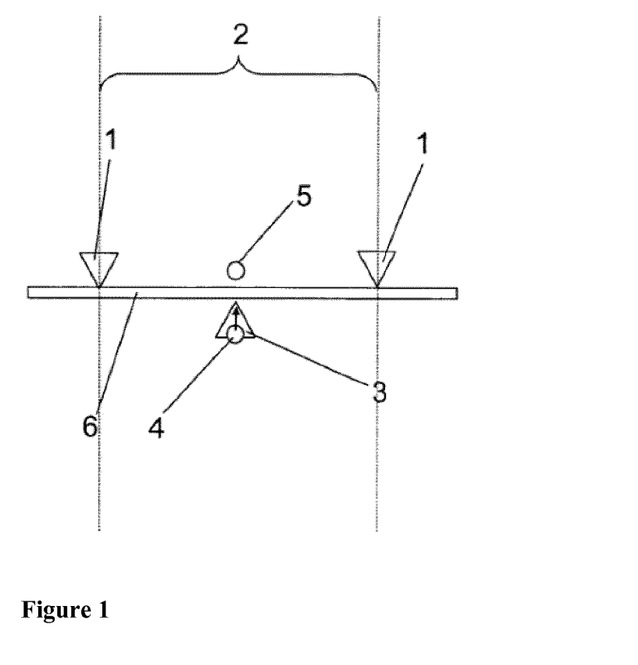
FIG. 1 shows a schematic representation of the experimental set up for stress whitening measurement.

Stress whitening is determined by a modified three point bending test, namely the reversed three point bending test, (cf. FIG. 1). The reversed three point bending test is carried out on a universal testing machine (Zwick Z010) at 50 mm/min. The samples are 2 mm thick injection moulded UL94 specimens (125×12.5×2 mm³). The experimental set-up consists of the reversed three point bending test coupled with an optical detection system.

The mechanical set up, as shown in FIG. 1, consists of:
a fix part (1), with a span (2) of 40 mm, a moving part including a loading edge (3) with a light source (4) and an optical sensor (5) fixed on the moving part closely above and beneath the specimen (6) by a vertical rod. This ensures that the distance between light source and optical sensor remains constant during the test, which is a prerequisite for a good reproducibility of the measurements.

Figure 2:
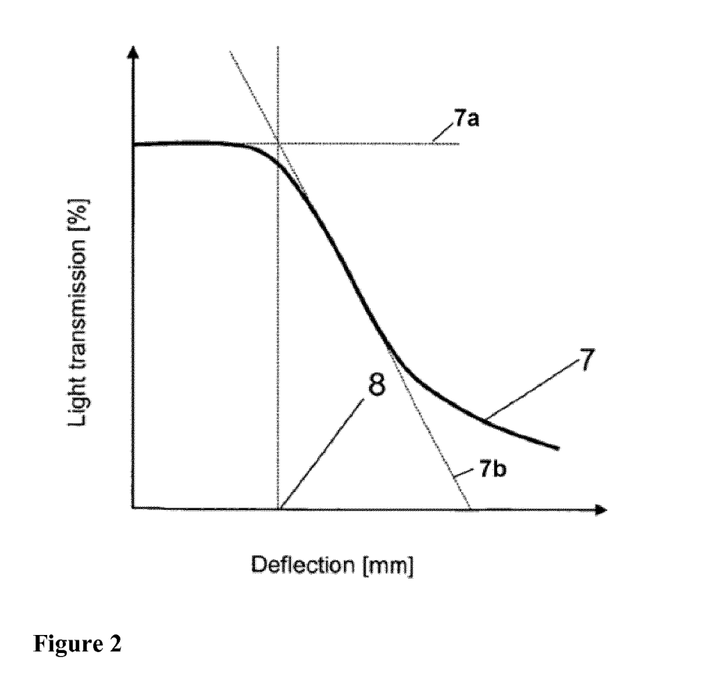
FIG. 2 shows a schematic diagram of the function recorded during the stress whitening experiment.

The force-deflection and the optical signal-deflection curves are recorded. As shown in FIG. 2, at the beginning of the test, the optical signal (7) is calibrated to 100% (7a), regardless of the initial transparency/haziness of the inserted sample. Occurrence of stress whitening is correlated with a sharp drop in the optical signal-deflection curve (cf. FIG. 2, reference number 8 and further below).

Three different parameters are determined:
a) stress whitening angle
b) residual size (width) of the blushing zones
c) stress whitening intensity a) The stress whitening angle [°], (also: bending angle or onset-angle) indicates, at which bending angle stress whitening (SW) occurs. The occurrence of stress whitening is correlated with a sharp drop of the optical response (light transmission) during bending (cf. FIG. 2). The onset angle (o.a.) for stress whitening is determined according to the following formula:

$$o.a. = (3 \times 10^{-5} \times s^4) - (2.1 \times 10^{-3} \times s^3) - (3.48 \times 10^{-2} \times s^2) + (6.4591 \times s) - 0.9997$$

wherein
"s" denominates the deflection of the loading edge at which the light transmission curve drops and is determined as illustrated in FIG. 2.

At the beginning of the test, the optical signal (7) is calibrated to 100% (7a), regardless of the initial transparency/haziness of the inserted sample. The deflection of the loading edge (s) at which the in the light transmission curve drops is determined by the abscissa-value (8) of the intersection between the tangent of the slope of the optical signal (7b) and the 100% line of the initial optical signal (7a).

b) Residual size (width) of the blushing zones immediately after a bending of 900 is measured in [mm], also denominated as "Res-SW 90°" or "residual stresswhitening". The width of a blushing zone (b) is determined as follows: Tests are conducted to a deflection corresponding to an angle of 90° according to the formula above. Then the specimen is abruptly unloaded with a crosshead speed of 400 mm/min. The width of the blushing area is measured immediately after testing using a slide gage.

c) Stress whitening intensity is the residual intensity of the blushing zone immediately after a bending of 900 (visual appreciation from 0 to 5, with 0: no remaining blush, 5: intensive whitening), also denominated as "SW-intensity".

Evaluation of the stress whitening intensity:

A mark of 0 is attributed when there is no residual blushing; a note of 5 when the whitening of the deformed zone is extremely pronounced. The obtained value is entered manually in a result sheet; average calculations are automated. The determination of these parameters is somewhat subjective and dependent on an operator. Although the obtained values are somewhat subjective they give essential information on the elastic recovery potential of the material.

What is important to notice, is:
a) an intensity of 0 is remarkably low (i.e. no blushing visible)
b) an intensity of up to 1 is excellent
c) an intensity between 1.1 and 1.5 is good
d) an intensity between 1.6 and 3 is acceptable
e) an intensity higher than 3 is insufficient Particle Size, Particle Size Distribution Particle size distribution in mass percent and particle sizes were determined by laser diffraction measurements by Coulter LS 200.

The particle size and particle size distribution is a measure for the size of the particles. The D-values ($D_5$ (or $d_5$)), ($D_{10}$ (or $d_{10}$), $D_{50}$ (or $d_{50}$), $D_{90}$ (or $d_{90}$)) and $D_{95}$ (or $d_{95}$)) represent the intercepts for 5%, 10%, 50%, 90% and 95% of the cumulative mass of sample. The D-values can be thought of as the diameter of the sphere which divides the sample's mass into a specified percentage when the particles are arranged on an ascending mass basis. For example the $D_5$ is the diameter at which 5% of the sample's mass is comprised of particles with a diameter less than this value. The $D_{10}$ is the diameter at which 10% of the sample's mass is comprised of particles with a diameter less than this value. The $D_{50}$ is the diameter of the particle where 50% of a sample's mass is smaller than and 50% of a sample's mass is larger than this value. The $D_{90}$ is the diameter at which 90% of the sample's mass is comprised of particles with a diameter less than this value. The $D_{95}$ is the diameter at which 95% of the sample's mass is comprised of particles with a diameter less than this value. The $D_{50}$ value is also called median particle size. From laser diffraction measurements according to ASTM 13320-1 the volumetric D-values are obtained, based on the volume distribution.

The distribution width or span of the particle size distribution is calculated from the D-values $D_{10}$, $D_{50}$ and $D_{90}$ according to the below formula:

$$\text{Span} = (D_{90} - D_{10})/D_{50}$$

The mean particle size is a calculated value similar to the concept of average. From laser diffraction measurements according to ASTM 13320-1 the volume based mean particle size is obtained and calculated as follows:

$$\overline{D}_{pq}^{(p-q)} = \frac{\Sigma D_i^p}{\Sigma D_i^q}$$

wherein D the average or mean particle size
(p-q) the algebraic power of Dpq, whereby p>q
Di the diameter of the $i^{th}$ particle
$\Sigma$ the summation of Dip or Diq representing all particles in the sample Only in symmetric particle size distributions the mean particle size and the median particle size $D_{50}$ have the same value.

2. Examples

The heterophasic polypropylene composition (HECO) applied in the present examples was prepared using a single-site catalyst.

Preparation of Single-Site Catalyst

Synthesis of Metallocene

The preparation of the metallocene complex of the single-site catalyst is described in detail in WO 2018/091684 A1 (MC-IE1 on page 66). The systematic name of the metallocene complex (MC) is rac-dimethylsilanediyl-bis[2-methyl-4-(3,5-dimethylphenyl)-5-methoxy-6-tert-butyl-inden-1-yl]zirconium dichloride.

Preparation of Catalyst

The metallocene described above was used in preparing a silica-MAO catalyst as follows.

The silica-MAO catalysts have been prepared on 30μ SUNSPERA DM-L-303 silica produced by AGC Si-Tech Co, additionally calcined at 600° C. for 2 hours under air. MAO was purchased from Chemtura and used as a 30 wt-% solution in toluene.

Step 1—Preparation of Silica-MAO
Toluene was dried over molecular sieves and degassed by bubbling with argon for at least 30 minutes.

Inside the glovebox, 10 g of the calcined silica was charged into a round-bottom flask equipped with an overhead stirrer and a sealed septum, and then 50 mL of dry and degassed toluene was added into it. The resulting suspension was cooled down to 0° C. under mild stirring (200-300 rpm) and 25 mL of MAO solution added dropwise.

After around 60 minutes, the cooling bath was removed and stirring was continued for 2 hours. The silica-MAO slurry was allowed to settle and then the supernatant toluene solution was siphoned off via a ⅔ teflon tube. Then, around 30 mL of dried and degassed toluene was added and the slurry was stirred for 15 minutes at room temperature.

The flask was placed into the oil bath and warmed up to 80° C. and the slurry solution was stirred for additional 15 min. Then the silica-MAO slurry was again allowed to settle for 10 min. The hot toluene solution was siphoned off.

This washing procedure was repeated one more time, and then an additional washing has been performed using pentane (30 ml pentane, stirring 15 min, settling 10 min). The pentane layer was siphoned off, then the solid was dried under argon flow at room temperature for about 3 h and at +50° C. for about 2 h. The white flowing MAO-silica powder was collected and used for all supported catalyst preparations.

Step 2—Preparation of Supported Metallocene Catalyst
Inside the glove box, 0.25 mL of MAO solution was added to a solution of the metallocene complex (32 mg in 1 ml of toluene) in a septum bottle. 1 g of dry silica-MAO powder was placed into a 20 mL glass vial, and the complex solution was added. The resulting slurry was allowed to stand overnight in the glove box. Then 5 mL of dried and degassed toluene was added; the bath temperature was set to 60° C. and stirred for 30 minutes. The solid catalyst was allowed to settle, and then the toluene layer was removed. The washing step was repeated twice more (2×5 mL toluene).

Then an additional washing step has been performed at room temperature using 5 ml of dry pentane. The slurry solution was stirred gently for 30 min. The pentane layer was siphoned off and then the solid was dried under argon flow at room temperature for 3 h. 1 g of a red silica supported flowing powder was collected.

Catalyst results are disclosed in Table 1.

TABLE 1

| ICP Zr/ wt % | ICP Al/ wt % | Al/Zr/ mol/mol | MC/ wt % |
| --- | --- | --- | --- |
| 0.18 | 15.4 | 290 | 1.69 |

Preparation of Heterophasic Polypropylene Composition (HECO)

The heterophasic polypropylene composition was prepared with a 3 step polymerization, meaning bulk (homopolymerization of propylene)+first step gas phase polymerization (homopolymerization of propylene)+second step gas phase polymerization (copolymerization of ethylene with propylene for rubber phase). The polymerization was done in a stirred 20 L autoclave reactor. The typical conditions are shown in Table 2 below.

TABLE 2

| Amount of catalyst /mg | | 51 |
| --- | --- | --- |
| Prepolymarization | Temperature/° C. | 30 |
| | Time/min | 10 |
| | H2/NL | 3.024 |
| Bulk polymerization | Temperature/° C. | 80 |
| | Time/min | 30 |
| | H2/NL | 3.024 |

TABLE 2-continued

| First gas phase polymerization | Temperature/° C. | 80 |
|---|---|---|
| | Pressure total/bar | 24 |
| | H2/NL | 2.01 |
| | Time/min | 40 |
| Second gas phase polymerization | Temperature/° C. | 70 |
| | Pressure total/bar | 20 |
| | H2/NL | 0 |
| | Time/min | 120 |
| | C2/C3/wt % | 0.25 |

The powder obtained was mixed with 1500 ppm of Irganox B215, 500 ppm of calcium stearate and compounded with TSE 16 twin screw extruder with melt temperature of 230° C. and throughout 1.5 kg/h.

The heterophasic polypropylene composition (HECO) has the following properties:

| $MFR_2$ | 4.1 g/10 min |
|---|---|
| SF | 9.0 wt % |
| C2(SF) | 16.0 wt % |
| IV(SF) | 3.3 dl/g |
| $T_m$ | 152° C. |

The high molecular weight high density ethylene polymer (HDPE) applied in the present examples was prepared using a Ziegler-Natta catalyst.

Preparation of Ziegler-Natta Catalyst

Solid Ziegler-Natta Catalyst Preparation

The catalyst used for the following example based on $MgCl_2 \cdot 3$ EtOH carrier was analogously prepared according to WO 2017/207493 A1 with the exception that the resultant catalyst particle size was as follows:

$d_{10}$=2.7 μm
$d_{50}$=9.5 μm
$d_{90}$=24.3 μm

The catalyst particle size can be obtained e.g. by sieving the carrier or catalyst in a suitable manner.

Off-Line Pre-Polymerized Ziegler-Natta Catalyst

Diluted Ziegler-Natta catalyst oil slurry (37.37 kg containing 4.9 wt % of solid Ziegler-Natta catalyst as described above was added to the reactor at 20° C. followed by 33 wt % solution of TEAL in heptane (0.87 kg; Al/Ti=1.0 mol/mol). Off-line pre-polymerization was initiated almost immediately after TEAL addition (stirring time about 5 min) by continuous addition of propylene at 20-25° C. A target pre-polymerization degree was set equal to 2 g polymer/gcat and the desired degree of pre-polymerization was reached after 5 h 10 min. The pressure was released and the reactor was flushed five times with nitrogen and then dried under vacuum for 1 h.

Dried off-line pre-polymerized Ziegler-Natta catalyst in oil was taken out into a catalyst drum. The yield was 42.97 kg containing 13.9 wt % of off-line pre-polymerized Ziegler-Natta catalyst with pre-polymerization degree of 2 polymer g/gcat. The off-line pre-polymerized Ziegler-Natta catalyst had a particle size distribution in the range of $d_{10}$=5-18 μm, $d_{50}$=12-35 μm and $d_{90}$=26-50 μm.

Preparation of High Molecular Weight High Density Ethylene Polymer (HDPE)

Polymerization was carried out in a prepolymerization reactor wherein prepolymerization of ethylene is carried out. Further polymerization steps were carried out in two loop reactors and in a gas phase reactor in this order. In the first and second loop reactors an ethylene homopolymer is produced. In the gas phase reactor ethylene is copolymerized with 1-hexene.

The polymerization conditions are given in Table 3 below.
The ethylene polymer powder (HDPE) has the following properties:

| $MFR_5$ | 0.07 g/10 min |
|---|---|
| $MFR_{21}$ | 5.35 g/10 min |
| Density | 955.6 kg/m³ |
| Content of 1-hexene | 0.16 mol% |
| $M_w$ | 465,000 g/mol |
| $M_w/M_n$ | 42.3 |

TEAL is triethylaluminium
DMDS is dimethoxydimethylsilane

TABLE 3

| Prepolymarization | Temperature/° C. | 50 |
|---|---|---|
| | Pressure/kPa | 5473 |
| | Catalyst feed/g/h | 5.7 |
| | TEAL feed/g/h | 5.1 |
| | C2 feed/kg/h | 3.9 |
| | H2/g/h | 2.0 |
| | Split/% | 2.6 |
| First Loop Reactor | Temperature/° C. | 95 |
| | Pressure/kPa | 5346 |
| | Propane feed/kg/h | 84 |
| | C2/mol % | 1.2 |
| | H2/C2/mol/kmol | 546.9 |
| | Split/% | 17.6 |
| | TEAL feed/g/h | 5.2 |
| | MFR2/g/10 min | 27.5 |
| Second Loop Reactor | Temperature/° C. | 95 |
| | Pressure/kPa | 5169 |
| | C2/mol % | 2.6 |
| | H2/C2/mol/kmol | 376.2 |
| | Split/% | 40.6 |
| | Propane feed/kg/h | 122.9 |
| | MFR2/g/10 min | 126 |
| Gas Phase Reactor | Temperature/° C. | 85 |
| | Pressure/kPa | 2000 |
| | H2/C2/mol/kmol | 0.61 |
| | C6/C2/mol/kmol | 17.1 |
| | Split/% | 39.2 |
| | DMDS feed/g/h | 2.5 |
| | Density/kg/m3 | 954.4 |
| | MFR5/g/10 min | 0.06 |
| | MFR21/g/10 min | 4.9 |

Preparation of Polypropylene Composition

The compounding was done in a TSE 16 twin screw extruder, with a melt temperature of 230° C. and throughput of 2 kg/h. Before compounding, desired amount of polymers and additives were premixed in an intensive mixer.

The following materials and compounds are used in the Examples

| HECO | as described above |
|---|---|
| HDPE | as described above |
| PE | bimodal polyethylene base resin powder having a of 950 kg/m³ (ISO 1872-2/ISO 1183), a melt flow rate $MFR_5$ of 0.24 g/10 min, a melt flow rate $MFR_{21}$ of 8 g/10 min (190° C., ISO 1133), a weight average molecular weight $M_w$ of 230,000 g/mol, and a molecular weight distribution $M_w/M_n$ |

| | | of about 30. The pelletized composition of this bimodal polyethylene base resin meets PE100 classification and is commercially available from Borealis AG |
|---|---|---|
| AO | | Irganox B 215 commercially available from BASF SE |
| AS | | calcium stearate |

Inventive and Comparative Examples

The compositions of the inventive and comparative examples and the respective properties thereof are indicated in Table 4 below.

As can be taken from Table 4, blending the heterophasic polypropylene with a conventional polyethylene (PE) results in improved properties except for the stiffness, which is reduced. This is the expected and known behaviour. When the heterophasic polypropylene is blended with a high molecular weight high density polyethylene, the impact strength is drastically improved, the stiffness is not reduced compared to the pure heterophasic polypropylene, and also the stress whitening properties (SW) are improved.

TABLE 4

Compositions of examples and properties thereof

| | | CE1 | CE2 | IE1 |
|---|---|---|---|---|
| HECO | wt % | 99.8 | 74.8 | 74.8 |
| HDPE | wt % | — | — | 25.0 |
| PE | wt % | — | 25.0 | — |
| AO | wt % | 0.15 | 0.15 | 0.15 |
| AS | wt % | 0.05 | 0.05 | 0.05 |
| $MFR_2$ | g/10 min | 3.18 | 1.95 | 1.6 |
| Flexural modulus | MPa | 1226 | 1145 | 1231 |
| NIS/23° C. | $kJ/m^2$ | 10.75 | 13.79 | 24.48 |
| NIS/−20° C. | $kJ/m^2$ | 1.94 | 2.04 | 2.1 |
| SW-angle | ° | 29.85 | 43.78 | 48.57 |
| SW-intensity | | 4 | 2.4 | 1.4 |
| Res-SW | | 3.22 | 2.2 | 1.36 |

The invention claimed is:

1. A polyolefin composition comprising a blend of:
(A) a heterophasic polypropylene composition comprising:
a propylene homopolymer or a propylene ethylene random copolymer and
an elastomeric ethylene propylene rubber, and
(B) 5.0 to 30.0 wt % of an ethylene homo- or copolymer, based on a weight of the polyolefin composition;
wherein the heterophasic polypropylene composition comprises:
(a1) 75.0 to 95.0 wt % of a crystalline fraction (CF) having an ethylene content of up to 4.0 wt % and a $MFR_2$ of 0.1 to 100 g/10 min, wherein $MFR_2$ is determined according to ISO 1133 at 230° C. under a load of 2.16 kg and,
(a2) 5.0 to 25.0 wt % of a soluble fraction (SF) having an ethylene content of 10.0 to 70.0 wt % and an intrinsic viscosity of 1.0 to 4.0 dl/g,
wherein the crystalline fraction (CF) and the soluble fraction (SF) are determined in 1,2,4-trichlorobenzene at 40° C., and
wherein the ethylene homo- or copolymer has a density of at least 941 kg/$m^3$ and a melt flow rate $MFR_{21}$ of 1.0 to 7.5 g/10 min, wherein $MFR_{21}$ is determined according to ISO 1133 at 190° C. under a load of 21.6 kg.

2. The polyolefin composition according to claim 1, wherein the ethylene homo- or copolymer has a density of at least 950 kg/$m^3$.

3. The polyolefin composition according to claim 1, wherein the ethylene homo- or copolymer is an ethylene copolymer and comprises a copolymer of ethylene and a $C_4$ to $C_{12}$ α-olefin.

4. The polyolefin composition according to claim 3, wherein the ethylene copolymer comprises a copolymer of ethylene and a comonomer selected from the group consisting of 1-butene, 1-hexene, 1-octene, and mixtures thereof.

5. The polyolefin composition according to claim 3, wherein the ethylene copolymer comprises one homopolymer fraction and one copolymer fraction that comprises 1-hexene as comonomer.

6. The polyolefin composition according to claim 1, wherein the ethylene homo- or copolymer has a weight average molecular weight $M_W$ of at least 250,000 g/mol.

7. The polyolefin composition according to claim 1, wherein the ethylene homo- or copolymer has a complex viscosity at a frequency of 0.05 rad/s $eta_{0.05}$ of 750 kPa·s to 1900 kPa·s.

8. The polyolefin composition according to claim 1, wherein the propylene homopolymer or propylene ethylene random copolymer and the elastomeric ethylene propylene rubber have been produced in the presence of a single-site catalyst (SSC).

9. The polyolefin composition according to claim 1, wherein the heterophasic polypropylene composition comprises 5.0 to 15.0 wt % of the soluble fraction (SF).

10. The polyolefin composition according to claim 1, wherein the soluble fraction (SF) has an ethylene content of 10.0 to 30.0 wt %.

11. The polyolefin composition according to claim 1, wherein the soluble fraction (SF) has an intrinsic viscosity of 2.0 to 4.0 dl/g.

12. The polyolefin composition according to claim 1, wherein the heterophasic polypropylene composition comprises:
(a3) 75.0 to 95.0 wt % of a xylene cold insoluble fraction (XCI) having an ethylene content of up to 4.0 wt % and an MFR2 of 0.1 to 100 g/10 min and,
(a4) 5.0 to 25.0 wt % of a xylene cold soluble fraction (XCS) having an ethylene content of 10.0 to 70.0 wt % and an intrinsic viscosity of 1.0 to 4.0 dl/g.

13. The polyolefin composition according to claim 12, wherein the xylene cold soluble fraction (XCS) has an intrinsic viscosity of 2.0 to 4.0 dl/g.

14. A molded article comprising the polyolefin composition according to claim 1.

15. The molded article according to claim 14, which is an injection molded article.

* * * * *